(12) United States Patent
Kolen et al.

(10) Patent No.: US 10,799,795 B1
(45) Date of Patent: Oct. 13, 2020

(54) REAL-TIME AUDIO GENERATION FOR ELECTRONIC GAMES BASED ON PERSONALIZED MUSIC PREFERENCES

(71) Applicant: Electronic Arts Inc., Redwood City, CA (US)

(72) Inventors: John Kolen, Foster City, CA (US); Harold Henry Chaput, Belmont, CA (US); Navid Aghdaie, San Jose, CA (US); Kazi Atif-Uz Zaman, Foster City, CA (US); Kenneth Alan Moss, Redwood City, CA (US)

(73) Assignee: Electronic Arts Inc., Redwood City, CA (US)

( * ) Notice: Subject to any disclaimer, the term of this patent is extended or adjusted under 35 U.S.C. 154(b) by 9 days.

(21) Appl. No.: 16/365,417

(22) Filed: Mar. 26, 2019

(51) Int. Cl.
| | |
|---|---|
| *A63F 13/67* | (2014.01) |
| *A63F 13/79* | (2014.01) |
| *A63F 13/54* | (2014.01) |
| *G06F 16/635* | (2019.01) |
| *G06N 3/08* | (2006.01) |
| *G06N 3/04* | (2006.01) |

(52) U.S. Cl.
CPC .............. *A63F 13/67* (2014.09); *A63F 13/54* (2014.09); *A63F 13/79* (2014.09); *G06F 16/635* (2019.01); *G06N 3/08* (2013.01); *G06N 3/04* (2013.01); *G06N 3/0445* (2013.01)

(58) Field of Classification Search
CPC .......... A63F 13/67; A63F 13/54; A63F 13/79; G06F 16/635; G06N 3/08; G06N 3/04; G06N 3/0445

USPC ........................................................ 463/35
See application file for complete search history.

(56) References Cited

U.S. PATENT DOCUMENTS

| | | | |
|---|---|---|---|
| 5,142,961 | A | 9/1992 | Paroutaud |
| 5,315,060 | A | 5/1994 | Paroutaud |
| 5,648,627 | A | 7/1997 | Usa |
| 5,808,219 | A | 9/1998 | Usa |
| 6,084,168 | A | 7/2000 | Sitrick |
| 6,297,439 | B1 | 10/2001 | Browne |
| 6,353,174 | B1 | 3/2002 | Schmidt |
| 6,482,087 | B1 | 11/2002 | Egozy |
| 6,898,729 | B2 | 5/2005 | Virolainen |

(Continued)

FOREIGN PATENT DOCUMENTS

WO    WO 2018/122730    7/2018

*Primary Examiner* — Allen Chan
(74) *Attorney, Agent, or Firm* — Knobbe, Martens, Olson & Bear, LLP

(57) ABSTRACT

Systems and methods are provided for real-time audio generation for electronic games based on personalized music preferences. An example method includes requesting listening history information from one or more music streaming platforms, the listening history information indicating, at least, music playlists to which a user created or is subscribed. A style preference associated with the user is determined based on the listening history information. A musical cue associated with an electronic game is accessed, with the musical being associated with music to be output by the electronic game based on a game state of the electronic game. Personalized music is generated utilizing one or more machine learning models based on the musical cue and the style preference, wherein the system is configured to provide the personalized music for inclusion in the electronic game.

20 Claims, 6 Drawing Sheets

(56) References Cited

U.S. PATENT DOCUMENTS

| | | | |
|---|---|---|---|
| 7,663,045 B2 * | 2/2010 | Schmidt | A63F 13/10 84/600 |
| 8,119,898 B2 | 2/2012 | Bentson | |
| 8,653,349 B1 | 2/2014 | White | |
| 9,002,885 B2 * | 4/2015 | Merrifield | A63F 13/12 463/32 |
| 9,418,636 B1 | 8/2016 | Malluck | |
| 9,576,050 B1 * | 2/2017 | Walters | G06F 16/639 |
| 9,866,731 B2 | 1/2018 | Godfrey | |
| 10,395,666 B2 | 8/2019 | Cook | |
| 2002/0005109 A1 | 1/2002 | Miller | |
| 2002/0134222 A1 | 9/2002 | Tamura | |
| 2003/0064746 A1 | 4/2003 | Rader et al. | |
| 2003/0094093 A1 | 5/2003 | Smith | |
| 2003/0164084 A1 | 9/2003 | Redmann | |
| 2003/0188626 A1 | 10/2003 | Kriechbaum et al. | |
| 2004/0131200 A1 | 7/2004 | Davis | |
| 2005/0260978 A1 | 11/2005 | Rader et al. | |
| 2006/0180005 A1 | 8/2006 | Wolfram | |
| 2007/0028750 A1 | 2/2007 | Darcie | |
| 2007/0039449 A1 | 2/2007 | Redmann | |
| 2007/0140510 A1 | 6/2007 | Redmann | |
| 2007/0245881 A1 | 10/2007 | Egozy | |
| 2007/0261535 A1 | 11/2007 | Sherwani et al. | |
| 2008/0113797 A1 | 5/2008 | Egozy | |
| 2008/0165980 A1 | 7/2008 | Pavlovic et al. | |
| 2009/0066641 A1 | 3/2009 | Mahajan | |
| 2009/0071315 A1 | 3/2009 | Fortuna | |
| 2009/0320669 A1 | 12/2009 | Piccionelli | |
| 2014/0100030 A1 * | 4/2014 | Burke | G07F 17/3204 463/31 |
| 2014/0254828 A1 | 9/2014 | Ray et al. | |
| 2014/0334644 A1 | 11/2014 | Selig et al. | |
| 2015/0143976 A1 | 5/2015 | Katto | |
| 2015/0161843 A1 * | 6/2015 | Keilwert | G07F 17/3209 463/31 |
| 2015/0179157 A1 | 6/2015 | Chon et al. | |
| 2016/0379611 A1 | 12/2016 | Georges et al. | |
| 2017/0005634 A1 | 1/2017 | Raz et al. | |
| 2017/0092247 A1 | 3/2017 | Silverstein | |
| 2017/0110102 A1 | 4/2017 | Colafrancesco et al. | |
| 2017/0140743 A1 | 5/2017 | Gouyon et al. | |
| 2017/0357479 A1 | 12/2017 | Shenoy et al. | |
| 2018/0271710 A1 | 9/2018 | Boesen et al. | |
| 2018/0322854 A1 | 11/2018 | Ackerman et al. | |
| 2018/0349492 A1 | 12/2018 | Levy et al. | |
| 2019/0018644 A1 | 1/2019 | Kovacevic et al. | |
| 2019/0091576 A1 * | 3/2019 | Taylor | A63F 13/30 |
| 2019/0237051 A1 | 8/2019 | Silverstein | |

* cited by examiner ly, this disclosure for generating audio. More specifically, this disclosure relates to generating music for utilization in electronic games.

REAL-TIME AUDIO GENERATION FOR ELECTRONIC GAMES BASED ON PERSONALIZED MUSIC PREFERENCES

TECHNICAL FIELD

The present disclosure relates to systems and techniques for generating audio. More specifically, this disclosure relates to generating music for utilization in electronic games.

BACKGROUND

Electronic games generally include pre-recorded audio, and the pre-recorded audio may be output to users during gameplay (e.g., via speakers). While an electronic game is being designed, one or more music composers may create music for the electronic game. This music may be created utilizing musical instrument digital interface (MIDI) software, for example based on musical scores. The music may also be recorded utilizing real-life performers. For example, real-life symphonic audio may be generated using a large-scale symphonic orchestra. The orchestra may be recorded during the performance, and the resulting recording utilized in the electronic game. The music created for the electronic game may be output during gameplay.

For example, certain music may be output based on a current game context. As an example, a start screen may be associated with a particular portion of the created music. As another example, a loading screen may be associated with another portion of the created music. As another example, particular music may be played by the electronic game while a user is performing a particular goal or action within the electronic game. In these examples, the electronic game may access specific music via monitoring the current game context.

Due to technical constraints associated with a size of the resulting electronic game, an amount of time required to create music, and so on, the created music may be of a limited length. It may therefore be appreciated that any created music may be repeatedly played to a user of an electronic game. With respect to the above, an electronic game may output a same portion of music each time the electronic game is started. Additionally, the electronic game may output a same portion of music each time the user reaches a particular portion of the electronic game. Since the user may return to the particular portion, for example to repeat objectives or for each of multiple attempts to complete the particular portion, the electronic game may thus repeatedly play the same portion. With respect to certain types of electronic games, such as online-based games, background music may continuously be played during the electronic game. For example, in a first-person shooter online game, the online game may cause continuous background music to be played.

At present, users of electronic games may thus grow tired or bored of the music being output to them. They may therefore prefer to reduce a volume associated with the in-game music or may play their own music with the in-game music turned off. Thus, there is a need for improved techniques to enable the generation of personalized music while avoiding the technical constraints described above.

SUMMARY OF CERTAIN EMBODIMENTS

Particular embodiments of the subject matter described in this specification can be implemented so as to realize one or more of the following advantages. Utilizing the techniques described herein, electronic games may present varied, and personalized, music to users of the electronic games. In contrast to current schemes in which music is pre-recorded, the techniques described herein enable real-time (e.g., substantially real-time) generation of music personalized to specific users. Thus, and as will be described, a user experience associated with playing electronic games may be improved. For example, users may avoid having to consistently hear the same music as they go about enjoying an electronic game.

In current electronic games, and with particular emphasis on higher-tier games, music may be utilized to great emotional effect within the games. The music may be used similarly to that of higher-tier movies, for which musical cues and patterns may be designed to evoke specific emotional responses. For example, symphonic music may be employed in movies to evoke feelings of sadness, happiness, excitement, and so on. In an electronic game, symphonic music may also be employed to elicit specific feelings depending on a user's current progression in the electronic game. An example electronic game may be a first-person game (e.g., a first-person shooter, role-playing game, and soon). For this example game, a user may traverse different in-game regions and perform disparate actions. As the user performs actions within the electronic game, an overall tone or feeling may be adjusted.

As an example, if the user encounters a plethora of non-playable characters (e.g., enemies), or other users with respect to an online game, the electronic game may utilize certain cues to evoke excitement. It may be appreciated that musical cues may form a basis, at least in part, for such evocation of excitement. For example, the music may increase in tempo or may be adjusted in style. As another example, the electronic game may output music with different themes, motifs, musical keys, different harmony or dissonance, and so on. With respect to a motif, the electronic game may optionally consistently utilize the motif to evoke excitement.

In this way, as the user plays the electronic game, the electronic game may adjust the music being output to the user. As will be described below, this adjustment may optionally be based on a current game state associated with the electronic game. A game state may represent game information (e.g., information for which the electronic game monitors), such as information associated with a progress of the user, current actions being performed by the user, upcoming events to be triggered, and so on. For example, the electronic game may trigger the output of certain music based on the user collecting a particular class of item. In this example, the music may include a particular theme which the user may associate with the action of collecting the particular class of items.

However, music within electronic games may begin to feel stale as users play the electronic games. For example, if an electronic game continuously utilizes a same, or similar, portion of music to evoke excitement, then users of the electronic game may grow tired of this portion. Thus, one of the uses of the portion (e.g., to evoke excitement) may be diminished. The users may then lower, or eliminate, a volume associated with this in-game music. Additionally, music within electronic games may not comport with certain users' style preferences. Thus, if the portion of music is associated with a first style (e.g., a particular genre of music), certain users may similarly lower, or eliminate, a volume associated with the in-game music. Instead, if this portion of music were to be adjusted in style to a second style, these users may have a much greater affinity, or emotional response, to in-game events, actions, and so on.

As will be described, a system described herein may access one or more music streaming services of a user. The system may obtain information indicative of musical preferences of the user, such as a listening history, playlists created or subscribed to by the user, and so on. The system may then determine a style or genre preference of the user. Based on this genre preference, the system may then utilize machine learning techniques to generate music for a particular electronic game which comports with this genre preference.

To generate the music, the system may access musical cues for the particular electronic game. For example, the musical cues may be created for use in the electronic game and may be indicative of a particular in-game context. An example musical cue may indicate a particular theme, motif, melody, and so on. In some embodiments, a musical cue may indicate a particular emotion or feeling to be achieved from the generated music. These musical cues may be created by a game composer or by a machine learning model. The system may generate music based on musical cues. For example, if a musical cue indicates a particular melody, then the system may generate music based on the melody and a genre preference for a user. As another example, if a musical cue indicates a particular emotion (e.g., happiness), then the system may generate music based on the emotion and genre preference. Therefore, the generated music may be based on specific musical cues, but adjusted for each user based on the user's empirically determined genre preferences.

Since the genre preferences have been determined based on actual listening habits of users, it may be appreciated that the resulting music may have a greater likelihood of keeping a user's interest. In this way, a user experience associated with an electronic game may be improved. As described above, this music may be generated utilizing machine learning models, for example in substantially real-time as the user plays an electronic game. Therefore, the music may optionally be generated such that it varies between uses. For example, a user may play a first-person game and reach a certain point within the game. Each time the user reaches this point, and absent the techniques described herein, the electronic game may output a same, or similar, portion of music (e.g., pre-recorded music). In contrast, the system may generate distinct music each time the user reaches the point. Advantageously, the distinct music may be in conformance with the user's genre preference and the musical cue associated with reaching the point.

The techniques described herein additionally improve upon the functioning of electronic games and prior schemes to generate audio. As described above, prior schemes lacked the technical ability to personalize music for end-users. Thus, electronic games were required to output a same set of music regardless of user preference. In contrast, the techniques described herein enable an electronic game to output consistent music regardless of user, which has been generated to be distinct according to user preference. Additionally, prior schemes required musical composers to utilize complex software, and spend large quantities of time, to generate different, and lengthy, musical audio clips for utilization in an electronic game. These different musical audio clips may then consume storage space of game systems utilized by end-users. In contrast, the techniques described herein allow musical composers to focus on crafting musical cues. The system described herein may then generate complex (e.g., polyphonic) music utilizing these musical cues. Since genre preferences of the end-users may be utilized to generate music, the techniques described herein may substantially expand upon the musical language which is achievable by an electronic game.

The systems, methods, and devices of this disclosure each have several innovative aspects, no single one of which is solely responsible for the all of the desirable attributes disclosed herein.

One embodiment discloses a method comprising: by a system of one or more computers, requesting listening history information from one or more music streaming platforms, the listening history information indicating, at least, music playlists to which a user created or is subscribed; determining, based on the listening history information, a style preference associated with the user; accessing a musical cue associated with an electronic game, the musical cue being associated with music to be output by the electronic game based on a game state of the electronic game; and generating, utilizing one or more machine learning models, personalized music based on the musical cue and the style preference, wherein the system is configured to provide the personalized music for inclusion in the electronic game.

Various embodiments of the method may include one, all, or any combination of the following features. Requesting listening history information comprises: receiving, from a user device executing the electronic game, information indicating initiation of the electronic game; obtaining authentication information associated with the user; and requesting the listening history information utilizing the authentication information. The system is configured to subscribe to updates, from the one or more music streaming platforms, of the user's listening history information. Determining a style preference comprises: grouping a threshold number of songs identified in the listening history information; generating the style preference based on the threshold number of songs. Generating the style preference comprises assigning a weight to each of a plurality of musical styles based on the threshold number of songs. Accessing a musical cue comprises: receiving, from a user device executing the electronic game, a unique identifier associated with a musical cue; and accessing one or more databases, and obtaining the musical cue based on the unique identifier. The method further comprises accessing, based on information identifying the electronic game, musical cues associated with the electronic game; and generating personalized music based on a plurality of the musical cues and the style preference. The plurality of the musical cues are selected based on the game state of the electronic game. A musical cue comprises a portion of musical audio or a melody. A machine learning model comprises a recurrent neural network or a convolutional neural network.

Some aspects feature a system comprising one or more computers and non-transitory computer storage media storing instructions that when executed by the one or more computers, cause the one or more computers to perform operations comprising: requesting listening history information from one or more music streaming platforms, the listening history information indicating, at least, music playlists to which a user created or is subscribed; determining, based on the listening history information, a style preference associated with the user; accessing a musical cue associated with an electronic game, the musical cue being associated with music to be output by the electronic game based on a game state of the electronic game; and generating, utilizing one or more machine learning models, personalized music based on the musical cue and the style preference, wherein the system is configured to provide the personalized music for inclusion in the electronic game.

Various embodiments of the system may include one, all, or any combination of the following features. Requesting listening history information comprises: receiving, from a user device executing the electronic game, information indicating initiation of the electronic game; obtaining authentication information associated with the user; and requesting the listening history information utilizing the authentication information. Determining a style preference comprises: grouping a threshold number of songs identified in the listening history information; generating the style preference based on the threshold number of songs. Generating the style preference comprises assigning a weight to each of a plurality of musical styles based on the threshold number of songs. Accessing a musical cue comprises: receiving, from a user device executing the electronic game, a unique identifier associated with a musical cue; and accessing one or more databases, and obtaining the musical cue based on the unique identifier. A machine learning model comprises a recurrent neural network or a convolutional neural network.

Some aspects feature non-transitory computer storage media storing instructions that when executed by a system of one or more computers, cause the computers to perform operations comprising: requesting listening history information from one or more music streaming platforms, the listening history information indicating, at least, music playlists to which a user created or is subscribed; determining, based on the listening history information, a style preference associated with the user; accessing a musical cue associated with an electronic game, the musical cue being associated with music to be output by the electronic game based on a game state of the electronic game; and generating, utilizing one or more machine learning models, personalized music based on the musical cue and the style preference, wherein the system is configured to provide the personalized music for inclusion in the electronic game.

Various embodiments of the computer storage media may include one, all, or any combination of the following features. Requesting listening history information comprises: receiving, from a user device executing the electronic game, information indicating initiation of the electronic game; obtaining authentication information associated with the user; and requesting the listening history information utilizing the authentication information. Determining a style preference comprises: grouping a threshold number of songs identified in the listening history information; generating the style preference based on the threshold number of songs, the style preference comprises an assigned weight to each of a plurality of musical styles, the assignment being based on the threshold number of songs. A machine learning model comprises a recurrent neural network or a convolutional neural network.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements.

The drawings are provided to illustrate embodiments of the subject matter described herein and not to limit the scope thereof.

Like reference numbers and designations in the various drawings indicate like elements.

DETAILED DESCRIPTION

Overview

Figure 1:
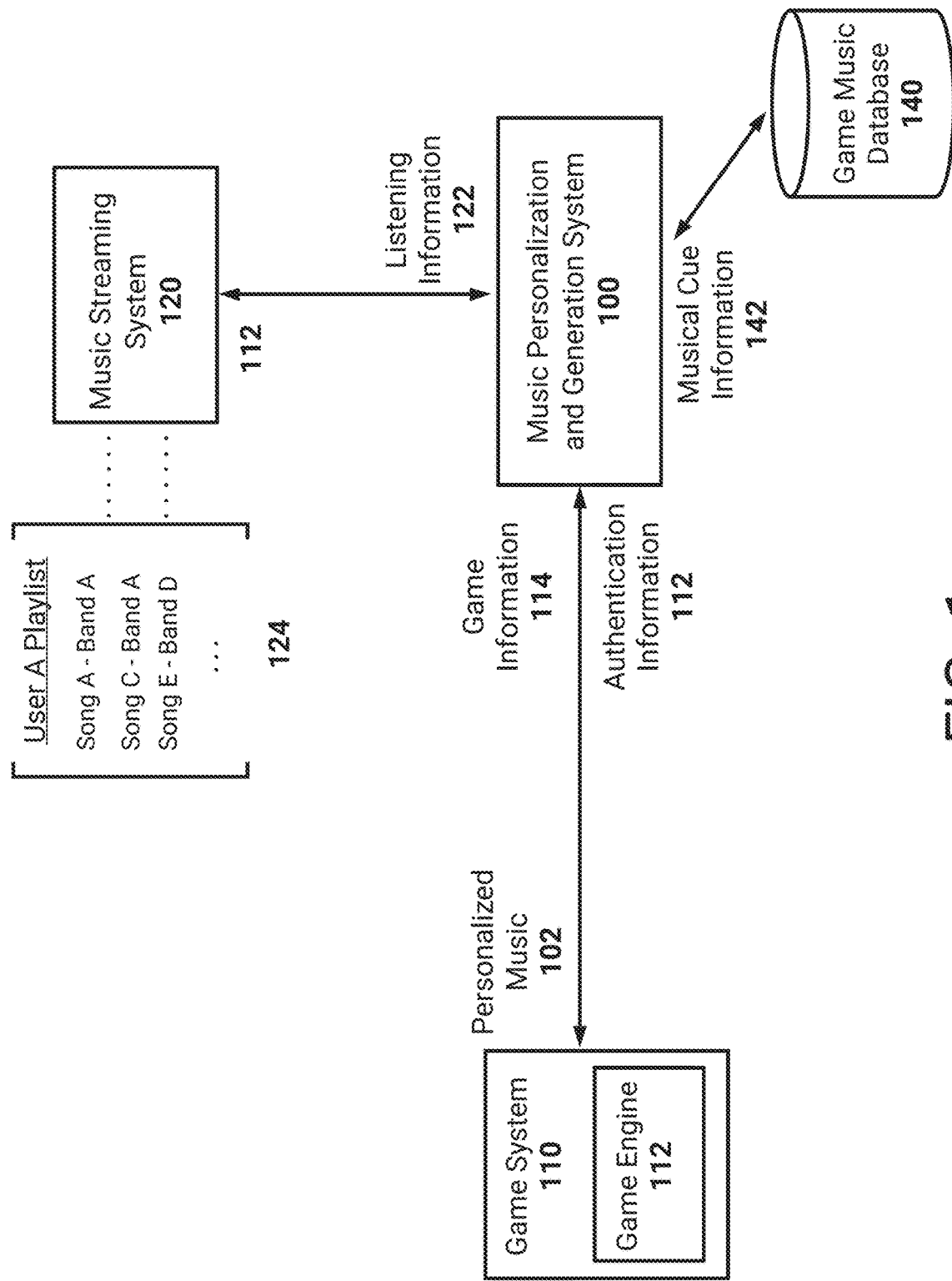
FIG. 1 is a block diagram illustrating an example music personalization and generation system generating personalized music.

This specification describes techniques to generate personalized music based on determined musical style preferences of users (referred to herein as a 'style preference'). A style preference of a user may indicate information indicative of preferred musical genres to which the user listens. As is known, music may be classified according to disparate features or qualities. These classifications may form categorizations of music, such as genres. Example genres may include symphonic music (e.g., classical, impressionist, modern), jazz, hip-hop, rock including subgenres thereof, electronic music, and so on. As will be described, a system described herein (e.g., the music personalization and generation system 100) may determine a style preference of a user and then generate music of a same, or similar, musical style. Advantageously, the generated music may be provided to the user during gameplay of an electronic game. In this way, the music being output to the user may be customized according to the user's preferences.

It may be appreciated that music in electronic games is typically pre-recorded music, for example utilizing MIDI or real-life performers. As described above, this pre-recorded music may grow tiresome to users of the electronic games such that they lower, or eliminate, a volume of the music. Utilizing machine learning techniques, the system may instead generate music in real-time (e.g., substantially real-time) as a user plays an electronic game. Example machine learning techniques may include utilization of artificial neural networks, such as recurrent neural networks and/or convolutional neural networks. These example machine learning techniques will be described in more detail below, with respect to at least FIG. 2. It may be appreciated that additional machine learning techniques may instead be utilized.

The system described herein may determine a style preference of a user via accessing the user's accounts with one or more music streaming platforms. Example music streaming platforms may include SPOTIFY, APPLE MUSIC, and so on. The system may receive authentication information from the user, such as a user name/password, authentication token, and so on. This authentication information may be utilized to access the user's music streaming platforms. In all situations in which personal information, or authentication information, of a user is utilized, it may be appreciated that these uses may be 'opt-in'. Thus, users may be required to affirmatively indicate that they wish to receive personalized music.

To provide authentication information, the user may utilize a user interface to specify the authentication information for use by the system. For example, the user interface may represent a log-in screen associated with a music streaming platform. Certain music streaming platforms may additionally enable the sharing of music listening information with outside systems, users, social media platforms, and so on. For example, as a user utilizes a music streaming platform, the listening history may be broadcast by the platform. This broadcast listening history may, for example, be consumed by a social media platform. The social media platform may thus present the user's listening history in substantially real-time, for example in a social network feed. In this way, friends of the user on the social media platform may view the music being listened to by the user. Similarly, the user may indicate that the system described herein is to receive such broadcast listening history. The system may then aggregate the listening history to determine a style preference of the user.

To determine the style preference, the system may optionally access metadata information associated with music being streamed by the user. For example, the metadata information may indicate a genre of each song or a genre of an artist. The system may then determine the genres which are being listened to by the user. As will be described, the system may generate music based on these determined genres. In some embodiments, the system may indicate that the style preference represents a threshold number of songs listened to by the user. For example, the system may access the user's listening history and select a threshold number of the most recently played songs. As will be described, the system may generate music based on these threshold number of songs. For example, the resulting music may represent a combination of features, or styles, extracted from the threshold number of songs by the system.

The determined style preference for the user may be utilized as the user plays an electronic game. As will be described, the user may initiate an electronic game on a user device, such as a video game console, laptop, handheld device, and so on. The system may receive information indicating the initiation, and may access the determined style preference. The style preference may then be utilized by the system to generate music, for example based on contextual information occurring in the electronic game. The generated music may, in some embodiments, be provided for output by the user device via a network (e.g., the internet). In some embodiments, the user device may generate personalized music according to the techniques described herein.

The electronic game may include certain musical cues which may be selected for output by the electronic game based on a current game state. A game state in this specification may be construed broadly, and may indicate contextual information associated with gameplay (e.g., information being monitored by the electronic game). Thus, the musical cues may be selected as the user plays the electronic game. As an example, a certain musical cue may be selected based on the user reaching a particular progression point within the electronic game. An example of a musical cue may include a musical theme, an indication of emotion, and so on. A musical composer for the electronic game may thus simply create a motif, theme, indicate an emotion, and the system may generate corresponding music. Additional examples of musical cues will be described below.

Utilizing a selected musical cue, the system may then generate music to be output during gameplay. As will be described, the system may utilize machine learning techniques to expound upon the selected musical cue. Advantageously, the generated music will be generated according to the determined style preference of the user. Thus, if the user prefers hip-hop then the system may generate music which is in a same style. In contrast, if a different user is playing the same electronic game, the system may generate music in a different style (e.g., jazz).

While the description below focuses on electronic games (e.g., video games), it may be understood that the techniques described herein may be applied to different use cases. For example, music may be generated for utilization in movies. In this example, a user of, for example, a video streaming platform may view a movie or television show via the platform. During the movie, music may be generated which comports with the user's style preferences. Similar to the description herein, the movie may comprise certain musical cues which may be adjusted by the system.

Furthermore, advantageously the techniques described herein may optionally be applied to any game, for example without modifying the electronic games. As an example, an electronic game may include pre-recorded music. The system may analyze the pre-recorded music, and generate personalized music based on the pre-recorded music. Without being constrained by theory, it may be appreciated that a convolutional neural network may utilize raw audio (e.g., audio waveforms). For example, the neural network may utilize WaveNets. This neural network may then generate personalized music according to a user's style preference. As another example, an electronic game may include representations of musical notes for output (e.g., a MIDI representation). The system may similarly utilize these representations to generate personalized music. In these examples, the system may receive audio being generated by the electronic game and replace it with its own generated audio.

Example Block Diagram

FIG. 1 is a block diagram illustrating an example music personalization and generation system 100 generating personalized music 102. As described above, the music personalization and generation system 100 may access a streaming music system 120 to determine a style preference of a user of a game system 110. The music personalization and generation system 100 may then generate personalized music 102 for output by the game system 110. The personalized music 102 may be based on current game information 114 associated with an electronic game being played on the game system 110. For example, the current game information 114 may represent a current game state of the electronic game. The current game information 114 may be utilized by the system 100 to select a musical cue 142. The music personalization and generation system 100 may then generate personalized music 102 using the musical cue 142 and the style preference of the user.

The music personalization and generation system 100 may be a system of one or more computers, one or more virtual machines executing on a system of one or more computers, and so on. Optionally, the music personalization and generation system 100 may represent a cloud-based system which receives information from multitudes of game systems. The game systems may optionally be executing different electronic games. In this way, the music personalization and generation system 100 may generate personalized music for each user. As will be described, the music personalization and generation system 100 may be in communication with a game music database 140. The game music database 140 may include musical cues 142 associated with the different electronic games, such that the music personalization and generation system 100 may generate personalized music for different electronic games.

The game system 110 may represent a user device of the user, such as a video game console, laptop or personal computer, handheld device, and so on. The game system 110 may include a game engine 112 associated with an electronic game. For example, a user of the game system 110 may select a particular electronic game via a user interface presented via the game system 110. The game system 110 may then initiate the electronic game for playing by the user.

In some embodiments, the game engine 112 may perform game processing and render visual elements of the electronic game for presentation via a display. For example, the game engine 112 may comprise executable code associated with the electronic game. The game system 110 may utilize graphics processing units, central processing units, and so on, to render the visual elements of the electronic game. Optionally, the electronic game may be played via a streaming platform. For example, the game system 110 may represent a thin client. The user may utilize an application (e.g., an 'app'), or a browser, to access the streaming platform. The visual elements, and game processing, may be performed by an outside system (e.g., a cloud-based system). These visual elements may then be provided to the game system 110 for presentation via a network (e.g., the internet). In these embodiments, the game engine 112 may thus represent an application associated with the streaming platform.

Upon initiation of the electronic game, the game system 110 may provide game information 114 to the music personalization and generation system 100. In some embedment's, the system 110 may provide game information 114 upon selection of an option to receive personalized music (e.g., an in-game option). The game information 114, as described above, may represent information indicative of a current game state. Absent the techniques described herein, it may be appreciated that an electronic game may adjust music being presented to a user based on a current game state. For example, if the user encounters a particular boss then the electronic game may output certain boss, or battle, music. The electronic game may thus utilize the game state as a trigger to access certain music for output to the user.

Similarly, the music personalization and generation system 100 may utilize received game information 114 to generate personalized music 102 appropriate for the current game state. For example, if the electronic game is presenting a start menu, the game information 114 may thus indicate the start menu. As another example, the user may be controlling a character within a certain region of the game-world. In this example, the game information 114 may indicate the certain region. As the user manipulates the character within the region, the game information 114 may be updated to indicate triggers or contextual information associated with the manipulation. In this way, if the user encounters a particular boss, or enters a particular room, the game information 114 may be updated to reflect these encounters.

The music personalization and generation system 100 may thus utilize the game information 114 to select one or more musical cues. These musical cues may be created, for example by a composer, for utilization in certain game contexts. Thus, there may be one or more musical cues associated with battling enemies, certain enemies, and so on. An example musical cue may include a motif, theme, snippet of audio, and so on, which the composer indicates is to be utilized for one or more game contexts. Another example musical cue may include an indication of emotion, or feeling, to be achieved by music generated for one or more game contexts. As an example, a musical cue may indicate that while battling an enemy, the music is to be perceived as causing excitement. Optionally, the musical cue may comprise a data structure (e.g., a vector) in which different emotions may be assigned weights or values. Thus, in the example of battling an enemy, the composer may assign a higher value for excitement than for other emotions. In this way, the composer may enable fine-grain control over the emotion to be achieved by the music.

As described above, the game information 114 may include information indicative of these game contexts. In some embodiments, the game information 114 may indicate a unique identifier associated with a musical cue. For example, as the user plays the electronic game, the electronic game may obtain a unique identifier associated with music to be output to the user. The electronic game may then provide the unique identifier to the music personalization and generation system 100. The music personalization and generation system 100 may access a musical cue associated with the received identifier.

Optionally, the electronic game may obtain multiple unique identifiers. For example, if the user is controlling a character within a game world, the electronic game may determine that a multitude of musical choices may be output depending on subsequent actions of the user. Thus, the electronic game may select a subset of the musical choices. As an example, the subset may be based on a likelihood of the user following certain choices. As another example, the subset may be based on a proximity of the user's character to triggers associated with the musical choices. The music personalization and generation system 100 may then access musical cues for each unique identifier, and generate personalized music 102. The game system 110 may receive the generated personalized music 102, and cache the music 102. Depending on the actions taken by the user, the game system 110 may output corresponding personalized music.

To generate personalized music 102, for example based on an obtained musical cue, the music personalization and generation system 100 may utilize listening information 122 obtained from one or more music streaming platforms. Examples of listening information may include playlists created by the user, playlists subscribed to by the user, specific songs or artists selected by the user, and so on. This listening information 122 may be utilized by the music personalization and generation system 100 to determine a style preference of the user.

As illustrated, the music personalization and generation system 100 may receive authentication information 112 from the game system 110. The authentication information 112 may include a user name/password associated with the user, an authentication token (e.g., an OAuth token), and so on. Optionally, the music personalization and generation system 100 may obtain information from a user profile associated with the user. For example, the user may create a user profile accessible to the system 100. The user may then include authentication information associated with a music streaming platform utilized by the user. In some embodiments, the user may indicate that the system 100 is authorized to receive listening information 122 from a music streaming platform. Thus, the music personalization and generation system 100 may store authentication information received from a music streaming platform indicating authorization to obtain (e.g., read) the user's listening information 122.

FIG. 1 illustrates an example playlist 124 being stored by a music streaming system 120 associated with an example music streaming platform. The example playlist 124 may represent a playlist created, or subscribed to, by the user utilizing an application associated with the platform (e.g., a web application, a mobile application, and so on). Information included in the playlist 124 may be provided to the music personalization and generation system 100. Example information may include an indication of the songs included in the playlist 124 (e.g., song title, artist name, and so on). Example information may further include an indication of metadata associated with the songs. For example, a genre of the song and/or artist may be included in the listening information 122. Example information may further include an indication of a different user who created the playlist. The music personalization and generation system 100 may optionally utilize style preferences of the different user to inform style preferences of the user of the game system 110. Optionally, the different user may be an artist on the streaming music platform. The user may have subscribed to this artist's playlist, and the music personalization and generation system 100 may utilize genre or style information associated with the artist.

To determine a style preference of the user, the music personalization and generation system 100 may utilize the received listening information 122 described above. For example, the music personalization and generation system 100 may aggregate songs the user has listened to within a threshold amount of time. The aggregated songs may be utilized by machine learning techniques to determine a style preference. For example, the style preference may represent a weighted, or learned, combination of the genres represented in the aggregated songs. Thus, if the user mainly listens to folk music, but occasionally listens to heavy metal, the music personalization and generation system 100 may determine the style preference as an aggregated version of folk music and heavy metal.

The music personalization and generation system 100 may also select the style preference based on a most listened to genre of music in the listening information 122. For example, if a measure of central tendency of a certain genre exceeds a threshold, the music personalization and generation system 100 may set the genre as the style preference. Optionally, the music personalization and generation system 100 may utilize a threshold number of prior songs to inform the determination. Optionally, the user may indicate that only certain playlists, songs, or artists, are to be utilized by the music personalization and generation system 100 when determining the user's style preference. For example, the user may occasionally listen to classical music, but may not prefer that symphonic music be output to the user during gameplay.

In some embodiments, the music personalization and generation system 100 may determine multiple style preferences for the user. For example, a musical cue may be designated by a composer as being appropriate for certain genres of music (e.g., orchestral, rock n roll, funk, and so on). Thus, when generating personalized music based on this musical cue, the music personalization and generation system 100 may select a style preference of the user which adheres closest to the genre indicated by the composer. Optionally, the music personalization and generation system 100 may analyze a musical cue and select a particular style preference based on the analyses. For example, a musical cue may be determined to be atmospheric. In this example, the music personalization and generation system 100 may select a style preference corresponding to slower, atmospheric, music (e.g., Brian Eno may be included in the user's listening information 122). As another example, a musical cue may be determined to have a high tempo, complicated beat patterns, and so on. Thus, the music personalization and generation system 100 may select a different style preference.

As will be described in more detail below, with respect to FIG. 2, the music personalization and generation system 100 may then generate personalized music 102 for the user. In embodiments in which the musical cue comprises a melody, theme, snippet of audio, the system 100 may generate music which expands upon the musical cue and is based on the style preference of the user. The musical cue may optionally be monophonic, such as melody line. The system 100 may utilize this melody line to generate complex polyphonic music. For example, the melody line may be provided to a neural network. The neural network may optionally be a sequence model, such as a recurrent neural network utilizing long short-term memory (LSTM) units. The neural network may thus generate music based on probabilistically determining music which best fits the melody line.

The game system 110 may then receive, and output, the personalized music 102. In some embodiments, the music personalization and generation system 100 may generate multitudes of personalized music 102. For example, the system 100 may access musical cues (e.g., from database 140) for the entirety of the electronic game. The system 100 may then generate personalized music based on the entirety of the musical cues. This generated music may then be provided to the game system 110 (e.g., to be cached by the system 110). Optionally, and as described above, the music personalization and generation system 100 may generate personalized music 102 for a subset of musical cues.

While FIG. 1 described the game system 110 as providing game information 114 to the music personalization and generation system 100, it may be appreciated that the game system 110 may generate personalized music. For example, the game engine 112 may include machine learning models which may be utilized to generate the music 102. The game engine 112 may store the weights, biases, hyperparameters, and so on, which are associated with the machine learning models. Thus, the game engine 112 may perform a forward pass of a machine learning model utilizing e a musical cue and style preference as an input.

Figure 2:
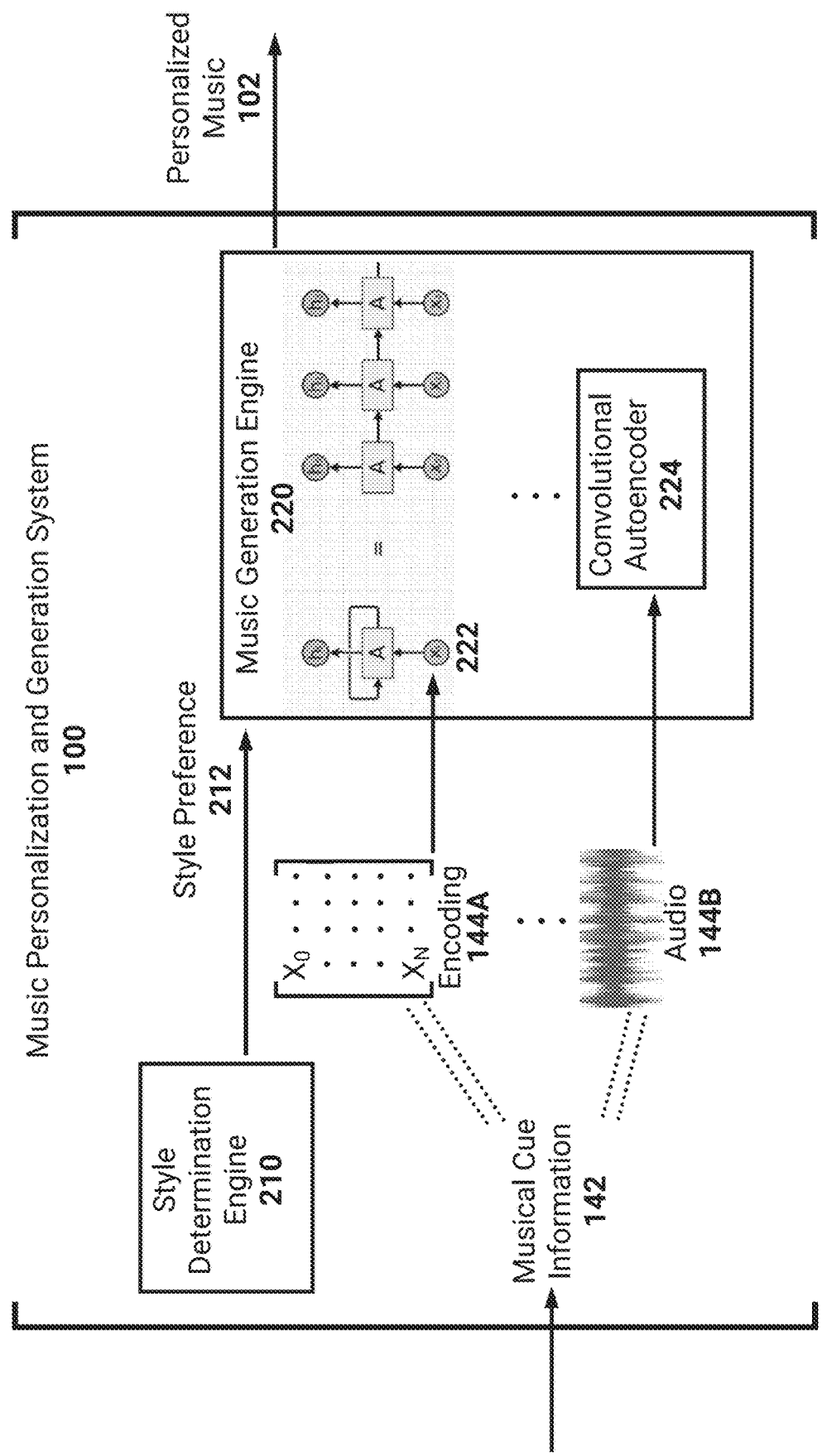
FIG. 2 is a block diagram illustrating details of the example music personalization and generation system.

FIG. 2 is a block diagram illustrating details of the example music personalization and generation system 100. As described above, the music personalization and generation system 100 may generate personalized music 102 for inclusion in an electronic game. A user of the electronic game may thus hear music which has been customized according to the user's musical style preference. The music personalization and generation system 100 may utilize a musical cue 142 to generate the personalized music 142, which a composer or game designer has specified. For example, the musical cue 142 may be associated with a particular context, or game state, within the electronic game. The music personalization and generation system 100 may identify a particular musical cue based on game information (e.g., information 114). The music personalization and generation system 100 may then generate personalized music 102 utilizing the musical cue (e.g., as a seed).

To generate the personalized music 102, the music personalization and generation system 100 includes a style determination engine 210. The style determination engine 210 may access, or receive information from, music streaming platforms utilized by a user. The style determination engine 210 may also obtain, or receive, playlists associated with music stored by the user. For example, the user may have local storage, or networked storage, which stores albums, songs, and so on, to which the user listens. In some embodiments, the user may specify styles or genres of music of interest to the user. For example, the user may utilize a user interface to select, or specify, styles. The user interface may optionally be presented via a web application associated with the music personalization and generation system 100. The user interface may also be presented during an initial set up, or in a settings menu, of the electronic game or game system 110.

As described in FIG. 1, the style determination engine 210 may determine a style preference 212 for the user. As an example, the style determination engine 210 may group a threshold number of songs or artists. For example the threshold number may represent a threshold number of recently listened to songs or artists. As another example, the threshold number may represent a threshold number of the most listened to songs or artists. The style determination engine 210 may then designate this group as the style preference 212 of the user.

With respect to the above grouping, the style determination engine 210 may determine features associated with the songs or artists included in the group. As an example, the style determination engine 210 may assign a weight to each of multiple genres represented in the group. This weight may, in some embodiments, represent a multi-hot encoding of the genres. As another example, the style determination engine 210 may determine features associated with the songs. For example, the features may indicate style information, such as tempo, key or chord changes, sequences of notes which are utilized, scales utilized, instruments which are represented, and so on. In some embodiments, the group of songs or artists may be provided to a machine learning model which may generate a learned representation or encoding of the style preference 212.

The music personalization and generation system 100 further includes a music generation engine 220. The music generation engine 220 may receive the determined style preference 212 from the style determination engine 210, and utilize the style preference 212 to generate personalized music. As described above, the personalized music 102 may be generated utilizing a musical cue 142. In some embodiments, the musical cue 142 may represent an indication of a particular emotion or feeling to be achieved from the personalized music 102. In some embodiments, the musical cue 142 may comprise a musical encoding 144A or an audio waveform 144B.

In the example of a musical encoding 144A, the musical cue 142 may be discretized into one or more example forms. The musical encoding 144A may thus represent an abstraction of a musical portion. As an example, the musical encoding 144A may include information identifying musical notes. These musical notes may be obtained from a score generated by a composer or game designer. The musical notes may also be obtained from a MIDI representation of the musical cue (e.g., a MIDI representation of a melody). The encoding 144A may include an indication of the musical notes in a multi-hot or single-hot encoding scheme. Additionally, the musical encoding 144A may include identifying information associated The musical encoding 144A may further include information indicative of timing. For example, the musical encoding 144A may be sampled at a particular rate. For musical notes which are sustained between samplings, the encoding 144A may include a label indicating the sustain (e.g., a continued note). For musical notes which are not sustained, the encoding 144A may include a label indicating when that a new note has started. Similarly, the musical encoding 144A may indicate information such as tempo, time signature, and so on.

While the above includes examples of storing a representation of a musical cue 142 in a data structure, it may be appreciated that the musical encoding 144A may be represented differently. For example, the musical encoding 144A may indicate quality information associated with musical notes. In this example, the quality information may indicate a measure of distortion, presence of overtone frequencies, whether it sounds percussive, has reverb, and so on. Thus, a composer or game designer may generate the musical cue 142 utilizing disparate instruments and the nuances of the sound may be captured in the musical encoding 144A.

In the example of an audio waveform 144B, a composer or game designer may record a portion of audio. For example, the audio waveform 144B may represent a recording of a composer utilizing an instrument. As another example, the audio waveform 144B may be generated by a MIDI instrument. In some embodiments, the audio waveform 144B may include a portion of complex (e.g., polyphonic) audio. In these embodiments, the audio waveform 144B may be a recording a symphony, one or more professional musicians, a complex electronic recording, and so on.

The audio waveform 144B may be provided along with label information. The label information may indicate features of the audio waveform, such as instruments represented in the audio waveform 144B. Additionally, specific dynamics may be labeled. For example, it may not be apparent from the audio waveform 144B how loud or soft the musical cue is to appear. Thus, the dynamics may be encoded (e.g., in a data structure) and utilized to generate the personalized music.

As illustrated in FIG. 2, the musical encoding 144A may be utilized as an input to an artificial neural network 222. For example, a recurrent neural network, such as a network utilizing long short-term memory units or gated recurrent units, may receive the musical encoding 144A. In addition the style preference 212 may be received by the neural network 222. This neural network 222 may then perform a forward pass through the units. As the received information is processed by the neural network 222, the network 222 may generate musical output. For example, the neural network 222 may be trained utilizing different input music. To ensure that long-term structure associated with generated output is maintained, the neural network 222 may leverage one or more techniques. Example techniques may include skip connections, utilizing attention, and so on. In this way, cohesive music may be generated. Optionally, one or more hand tuned models may be utilized to ensure that notes do not substantially vary in pitch, or are not repeated too often.

The style preference 212 may inform a particular style of the personalized music 102 generated by the neural network 222. For example, during training the neural network 222 may learn a meaning associated with input styles. As described above, style or genre may be encoded. In some embodiments, the neural network 222 may learn a style embedding (e.g., as a contextual input, which may be connected with each layer). Based on this style encoding or embedding, the neural network 222 may be able to translate between style domains.

As illustrated in FIG. 2, the audio waveform 144B may be utilized as an input to a different artificial neural network 224. For example, a convolutional autoencoder may be utilized. The convolutional autoencoder 224 may comprise a multitude of convolutional layers. The received audio waveform 144B may be transformed from a time series through the convolutional layers. In some embodiments, the convolutional layers may represent WaveNet layers. The convolutional autoencoder may be trained utilizing multiple autoencoder pathways, for example one per style or genre. Subsequent to training, the audio waveform 144B may be analyzed by the network 224 in view of the style preference 212. The network 224 may then generate personalized music 102 in accordance with the style preference.

Example Flowcharts

Figure 3:
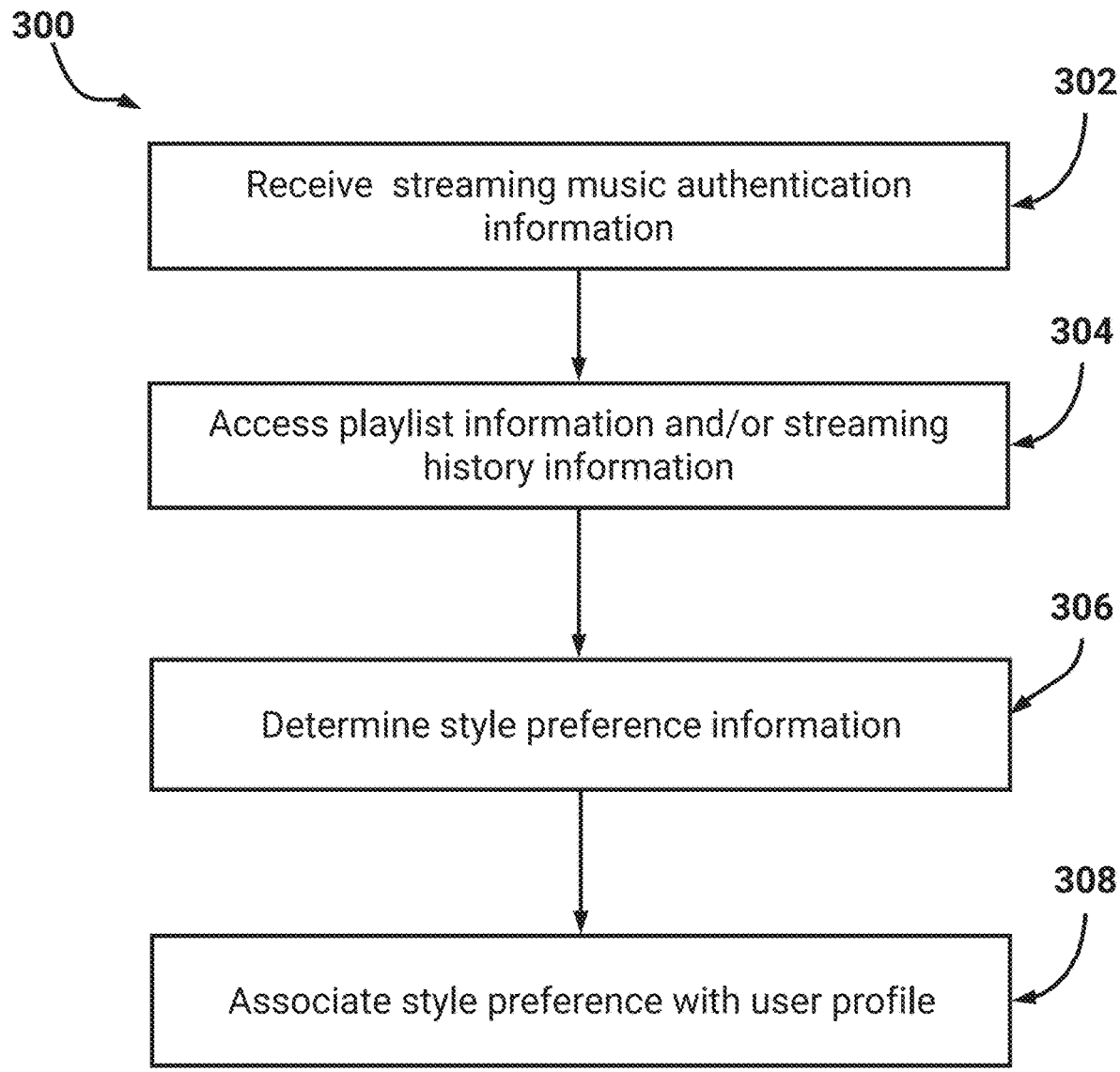
FIG. 3 is a flowchart of an example process for associating a determined musical style preference with a user.

FIG. 3 is a flowchart of an example process 300 for associating determined a musical style preference with a user. For convenience, the process 300 will be described as being performed by a system of one or more computers (e.g., the music personalization and generation system 100). In some embodiments, a user device of one or more processors (e.g., the game system 110) may perform one or more of the blocks described below.

At block 302, the system receives authentication information associated with one or more music streaming platforms. As described above, the user may provide a user name/password associated with the one or more music streaming platforms to the system. Optionally, upon initiation of an electronic game, the electronic game may request authorization to access the user's music streaming platform. Optionally, the electronic game may include a setting to enable the system's access.

At block 304, the system accesses listening information from the music steaming platforms. The system may receive playlist information, such as playlists the user has created utilizing the music streaming platforms. The system may also receive streaming history information, such as a recent, or the entirety of, listening history by the user.

At block 306, the system determines a style preference of the user. The system may utilize the listening information to determine a style or genre preference. This determined style preference may represent a model associated with styles of music to which the user listens. As described in FIGS. 1-2, the system may group recently listened to songs or artists together. The system may then generate the style preference based on this grouping. For example, the system may assign a weight or value for each of a multitude of musical styles. This assigned weight or value may then be utilized to generate personalized music for the user. In some embodiments, the system may identify a threshold number of styles to which the user listens. For example, these may represent a most commonly listened to number of styles. When generating personalized music, the system may then select from among the styles.

At block 308, the system associates the determined style preference with the user. Optionally, the system may store a user profile associated with the user. The style preference of the user may include in this user profile, such that the system may access the style preference when generating personalized music. Optionally, the system may periodically access listening information associated with the user and re-determine style preference information. The system may then associated the determined style preference with the user.

Figure 4:
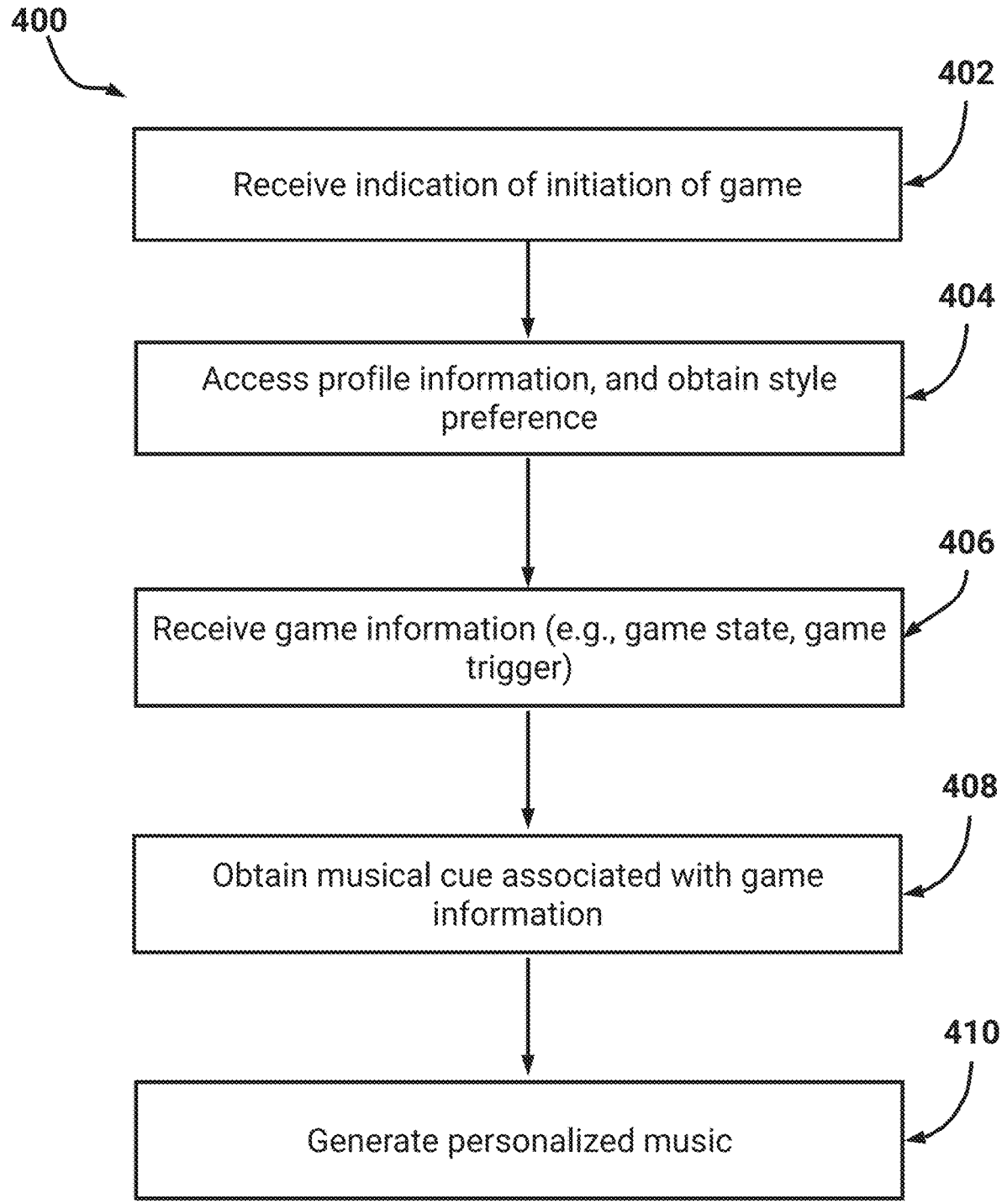
FIG. 4 is a flowchart of an example process for generating personalized music based on a musical preference.

FIG. 4 is a flowchart of an example process for generating personalized music based on a style preference. For convenience, the process 400 will be described as being performed by a system of one or more computers (e.g., the music personalization and generation system 100). In some embodiments, a user device of one or more processors (e.g., the game system 110) may perform one or more of the blocks described below.

At block 402, the system receives an indication of initiation of an electronic game. As described above, the user may utilize a user device, such as a game console, laptop, and so on, to initiate an electronic game. In implementations in which the system provides personalized music via a network (e.g., the internet) to the user device, the system may receive the initiation via the network. In some implementations, the system may represent an engine, or module, included in the user device. In these implementations, the engine or module may receive the initiation. The engine or module may then generate personalized music for inclusion in the electronic game.

At block 404, the system obtains a style preference of the user. As described in FIG. 3, the system may store a style preference which has been determined from listening information of the user. In some embodiments, the system may receive information from the user specifying the style preference in lieu of determining the style preference. For example, the system may prompt the user for an indication of preferred style. The user may then select from among the indicated styles, for example in a user interface, or may provide verbal input identifying a style.

At block 406, the system receives game information. As the user plays the electronic game, the game state may be adjusted based on gameplay. The system may monitor this game information to ascertain which music is to be played via the electronic game. As described above, the electronic game may provide one or more unique identifiers associated with musical cues to the system. That is, instead of the system utilizing a game state to identify a musical cue, the system may receive information identifying a specific musical cue.

At block 408, the system obtains a musical cue associated with the game information. The system may maintain musical cues for the electronic game, and optionally for a multitude of electronic games. Thus, the system may utilize the game information, such as a unique identifier, to obtain the corresponding musical cue. In some embodiments, the system may obtain a multitude of musical cues. For example, upon initiation of the electronic game the system may obtain multiple musical cues. The system may then generate personalized music 410 based on these musical cues. In this way, the system may rapidly provide music to the electronic game as the user traverses the electronic game.

At block 410, the system generates personalized music. As described in FIGS. 1-2, the system may generate personalized music based on one or more obtained musical cues and the style preference. As an example, a musical cue may include a theme, motif, melody, snippet of audio, and so on. In this example, the system may generate music in the user's style preference. The system may then provide (e.g., as a stream, or as a download) the personalized music to the user's user device. In implementations in which the user device generates the personalized music, the engine or module executing on the user device may generate the personalized music. The electronic game may listen for updates from the engine or module, and may include the personalized music in the electronic game.

The system may generate a threshold length of personalized music. The threshold may be based on the musical cue, or may be set by a game designer or composer. For example, certain music may represent background music. For the background music, the system may generate lengthy background music. As another example, certain music may represent short musical cues based on a user triggering some action or event within the electronic game. In this example, the system may generate shorter music. Optionally, the system may receive updates from the user device. For example, with respect to background music the user device may indicate that the user has, or is about to, exceed the generated background music length. In this example, the system may generate additional personalized music to be included in the background.

In some implementations, the system may utilize personalized music which has been generated for one or more other users. For example, instead of generating personalized music for each user, the system may identify one or more other users with similar style preferences to the user. In this example, the system may determine respective measure of similarity between users. With respect to the style preference being a weight or value for a multitude of styles, the system may compute a measure of difference between these weights or values (e.g., an L1 or L2 norm). Thus, the system may obtain personalized music for a similar user. The system may then provide the obtained personalized music to the user. In this way, if two users listen to substantially similar music the system may conserve processing resources associated with generating music.

Figure 5:
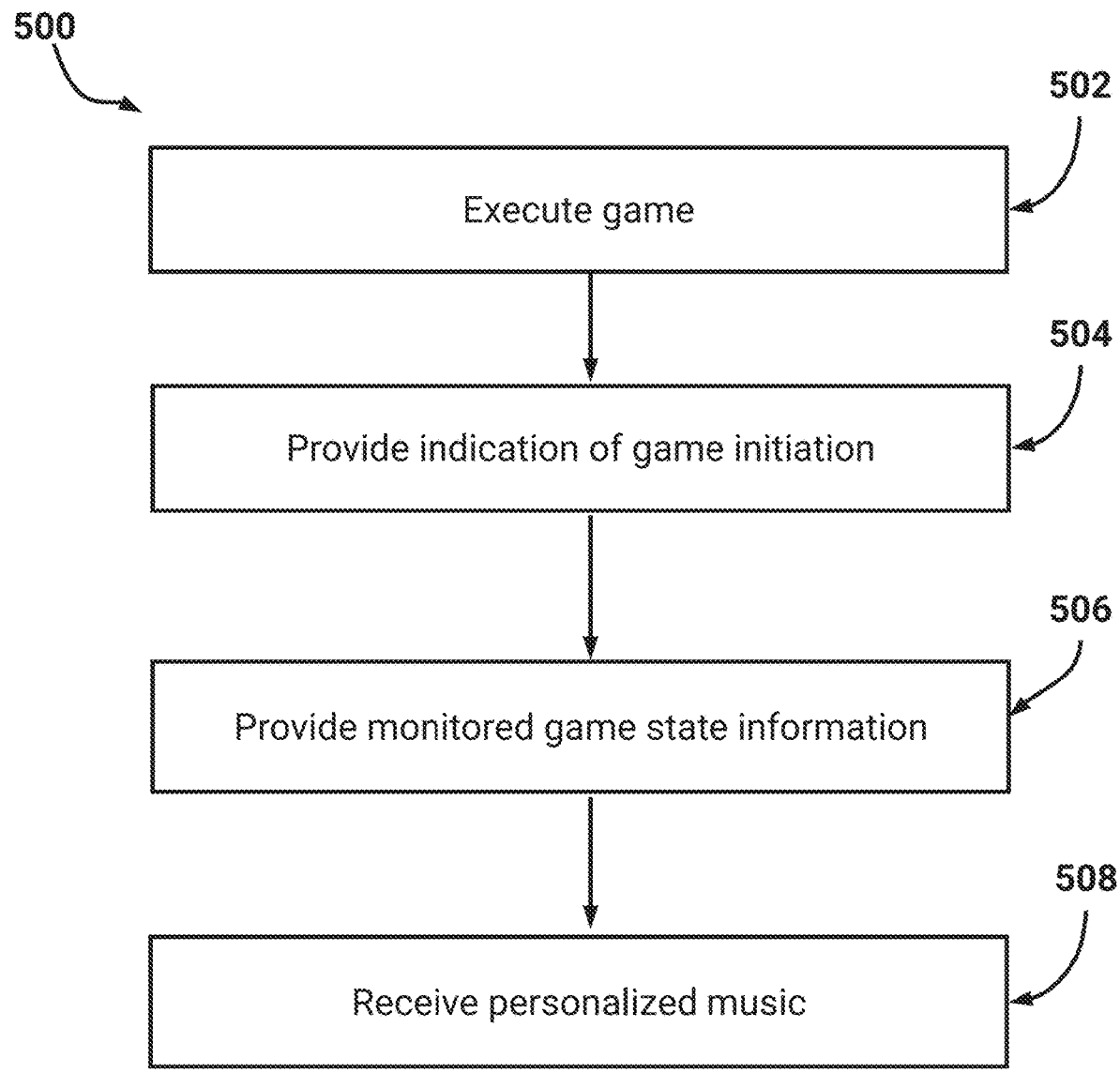
FIG. 5 is a flowchart of an example process for an electronic game to output personalized music.

FIG. 5 is a flowchart of an example process for an electronic game to output personalized music. For convenience, the process 500 will be described as being performed by a user device of one or more processors (e.g., the game system 110).

At block 502, the user device executes a game. As described herein, the user device may represent a game console, laptop, handheld device, and so on. Thus, the user device may execute the electronic game as stored, or made accessible to, the user device. The user device may also represent a laptop presenting visual information which is rendered by an outside system (e.g., a cloud-based system). In this example, the user device may indicate that the electronic game is to be played. The outside system may then initiate the game, and provide visual information for presentation via the user device.

At block 504, the user device provides indication of game initiation. As described in block 504, the user device may provide information identifying that the game has started to a particular system (e.g., the system 100).

At block 506, the user device provides monitored game state information. As described above, the user device may provide information identifying musical cues which are to be output during game play.

AT block 508, the user device receives personalized music. The particular system (e.g., the system 100) may generate personalized music, and provide it for output by the user device. In some embodiments, the user device may generate the personalized music. In some embodiments, the user device may store (e.g., cache) previously received personalized music. In these embodiments, the user device may identify whether a user's listening history has changed greater than a threshold since the personalized music was received. For example, the user device may access one or more music streaming platforms. As another example, the user device may cause the particular system to access the music streaming platforms. Upon access, the current listening history may be compared to prior listening history. If the listening history is different according to one or more measures, the system may generate new personalized music. If the listening history is not different, the user device may utilize the stored personalized music.

Overview of Computing Device

Figure 6:
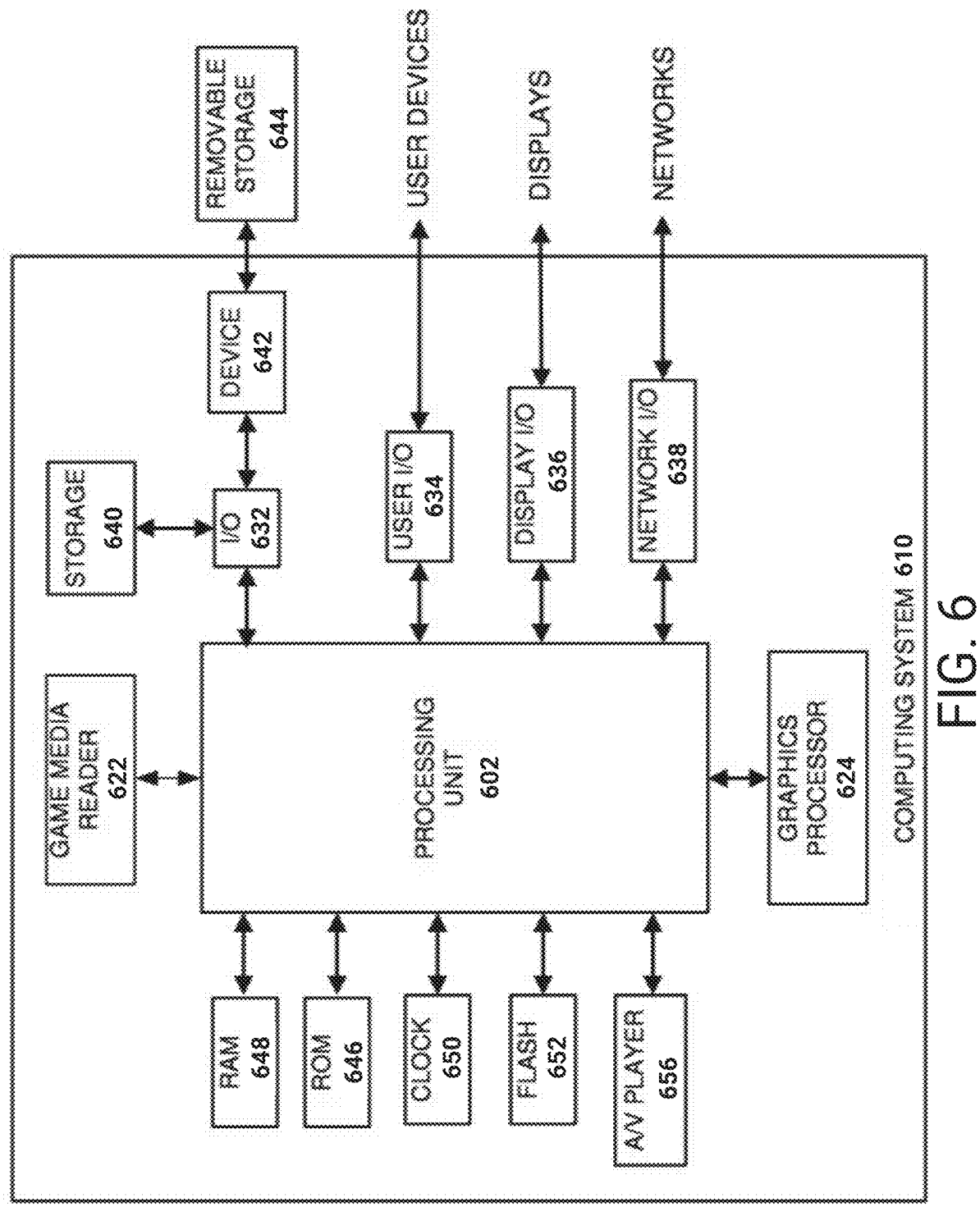
FIG. 6 illustrates an embodiment of computing device according to the present disclosure.

FIG. 6 illustrates an embodiment of computing device 610 according to the present disclosure. Other variations of the computing device 610 may be substituted for the examples explicitly presented herein, such as removing or adding components to the computing device 610. The computing device 610 may include a game device, a smart phone, a tablet, a personal computer, a laptop, a smart television, a car console display, a server, and the like. The computing device 610 may also be distributed across multiple geographical locations. For example, the computing device 610 may be a cluster of cloud-based servers.

As shown, the computing device 610 includes a processing unit 620 that interacts with other components of the computing device 610 and also external components to computing device 610. A game media reader 622 is included that communicates with game media 612. The game media reader 622 may be an optical disc reader capable of reading optical discs, such as CD-ROMs or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively or additionally, the computing device 610 may include a discrete graphics processor 624 that is separate from the processing unit 620. In some such cases, the graphics processor 624 may have separate RAM from the processing unit 620. Computing device 610 might be a handheld game application device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a video game is being played.

User I/O 634 is used to send and receive commands between processing unit 620 and user devices, such as game controllers. In some embodiments, the user I/O 634 can include a touchscreen input. The touchscreen can be capacitive touchscreen, a resistive touchscreen, or other type of touchscreen technology that is configured to receive user input through tactile inputs from the player. Display I/O 636 provides input/output functions that are used to display images from the game being played. Network I/O 638 is used for input/output functions for a network. Network I/O 638 may be used during execution of a game, such as when a game is being played online or being accessed online, application of fraud detection, and/or generation of a fraud detection model.

Display output signals produced by display I/O 636 comprise signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610.

The computing device 610 can also include other features that may be used with a video game, such as a clock 650, flash memory 652, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM 648 is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads game media 612 and provides an application, information may be read from game media 612 and stored in a memory device, such as RAM 648. Additionally, data from storage 640, ROM 646, servers accessed via a network (not shown), or removable storage media 644 may be read and loaded into RAM 648. Although data is described as being found in RAM 648, it will be understood that data does not have to be stored in RAM 648 and may be stored in other memory accessible to processing unit 620 or distributed among several media, such as game media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
   by a system of one or more computers,
   requesting listening history information from one or more music streaming platforms, the listening history information indicating, at least, music playlists to which a user created or is subscribed;
   determining, based on the listening history information, a style preference associated with the user;
   accessing a musical cue associated with an electronic game, the musical cue being associated with music to be output by the electronic game based on a game state of the electronic game; and
   generating, utilizing one or more machine learning models, personalized music based on the musical cue and the style preference, wherein the system is configured to provide the personalized music for inclusion in the electronic game.

2. The computer-implemented method of claim 1, wherein requesting listening history information comprises:
   receiving, from a user device executing the electronic game, information indicating initiation of the electronic game;
   obtaining authentication information associated with the user; and
   requesting the listening history information utilizing the authentication information.

3. The computer-implemented method of claim 1, wherein the system is configured to subscribe to updates, from the one or more music streaming platforms, of the user's listening history information.

4. The computer-implemented method of claim 1, wherein determining a style preference comprises:
   grouping a threshold number of songs identified in the listening history information;
   generating the style preference based on the threshold number of songs.

5. The computer-implemented method of claim 4, wherein generating the style preference comprises assigning a weight to each of a plurality of musical styles based on the threshold number of songs.

6. The computer-implemented method of claim 1, wherein accessing a musical cue comprises:
   receiving, from a user device executing the electronic game, a unique identifier associated with a musical cue; and
   accessing one or more databases, and obtaining the musical cue based on the unique identifier.

7. The computer-implemented method of claim 1, further comprising:
   accessing, based on information identifying the electronic game, musical cues associated with the electronic game; and
   generating personalized music based on a plurality of the musical cues and the style preference.

8. The computer-implemented method of claim 7, wherein the plurality of the musical cues are selected based on the game state of the electronic game.

9. The computer-implemented method of claim 1, wherein a musical cue comprises a portion of musical audio or a melody.

10. The computer-implemented method of claim 1, wherein a machine learning model comprises a recurrent neural network or a convolutional neural network.

11. A system comprising one or more computers and non-transitory computer storage media storing instructions that when executed by the one or more computers, cause the one or more computers to perform operations comprising:
    requesting listening history information from one or more music streaming platforms, the listening history information indicating, at least, music playlists to which a user created or is subscribed;
    determining, based on the listening history information, a style preference associated with the user;
    accessing a musical cue associated with an electronic game, the musical cue being associated with music to be output by the electronic game based on a game state of the electronic game; and
    generating, utilizing one or more machine learning models, personalized music based on the musical cue and the style preference, wherein the system is configured to provide the personalized music for inclusion in the electronic game.

12. The system of claim 11, wherein requesting listening history information comprises:
    receiving, from a user device executing the electronic game, information indicating initiation of the electronic game;
    obtaining authentication information associated with the user; and
    requesting the listening history information utilizing the authentication information.

13. The system of claim 11, wherein determining a style preference comprises:
    grouping a threshold number of songs identified in the listening history information;
    generating the style preference based on the threshold number of songs.

14. The system of claim 13, wherein generating the style preference comprises assigning a weight to each of a plurality of musical styles based on the threshold number of songs.

15. The system of claim 11, wherein accessing a musical cue comprises:
    receiving, from a user device executing the electronic game, a unique identifier associated with a musical cue; and
    accessing one or more databases, and obtaining the musical cue based on the unique identifier.

16. The system of claim 11, wherein a machine learning model comprises a recurrent neural network or a convolutional neural network.

17. Non-transitory computer storage media storing instructions that when executed by a system of one or more computers, cause the computers to perform operations comprising:

requesting listening history information from one or more music streaming platforms, the listening history information indicating, at least, music playlists to which a user created or is subscribed;

determining, based on the listening history information, a style preference associated with the user;

accessing a musical cue associated with an electronic game, the musical cue being associated with music to be output by the electronic game based on a game state of the electronic game; and generating, utilizing one or more machine learning models, personalized music based on the musical cue and the style preference, wherein the system is configured to provide the personalized music for inclusion in the electronic game.

18. The computer storage media of claim 17, wherein requesting listening history information comprises:

receiving, from a user device executing the electronic game, information indicating initiation of the electronic game;

obtaining authentication information associated with the user; and requesting the listening history information utilizing the authentication information.

19. The computer storage media of claim 17, wherein determining a style preference comprises:

grouping a threshold number of songs identified in the listening history information;

generating the style preference based on the threshold number of songs, the style preference comprises an assigned weight to each of a plurality of musical styles, the assignment being based on the threshold number of songs.

20. The computer storage media of claim 17, wherein a machine learning model comprises a recurrent neural network or a convolutional neural network.

* * * * *